United States Patent [19]

Clark

[11] Patent Number: 5,161,564
[45] Date of Patent: Nov. 10, 1992

[54] AUTOMATIC SEPARATOR VALVE

[76] Inventor: Stephen E. Clark, 1344 Monterey Ave., Norfolk, Va. 23508

[21] Appl. No.: 760,357

[22] Filed: Sep. 16, 1991

Related U.S. Application Data

[63] Continuation-in-part of Ser. No. 709,105, Jun. 3, 1991, abandoned.

[51] Int. Cl.$^5$ ............................................. F16K 31/28
[52] U.S. Cl. .................................. 137/172; 137/192; 137/423
[58] Field of Search ............... 137/172, 192, 423, 433

[56] References Cited

U.S. PATENT DOCUMENTS

| | | | |
|---|---|---|---|
| 646,832 | 4/1900 | Houghton | 137/423 X |
| 1,201,558 | 10/1916 | Cobb | 137/172 X |
| 1,995,742 | 3/1935 | Linnmann | 137/172 X |
| 4,132,238 | 1/1979 | Clark | 137/172 |
| 4,993,086 | 2/1991 | Palma | 137/423 X |

Primary Examiner—Alan Cohan

[57] ABSTRACT

An automatically resetting mechanical valve used to control unwanted discharge of liquids less dense than water, principally oil, which may be present in waste water flows. The valve is closed by sinking both a primary float and a secondary float, each less dense than water but more dense than the liquid whose discharge is to be stopped. The sinking primary float effectively closes an orifice in an outlet conduit upon the sinking primary float's becoming sufficiently immersed in the less dense liquid. Upon the reintroduction of water, the secondary float acts upon a lever of high mechanical advantage, which pries the primary float upward, which, in turn, allows hydraulic pressure inside and outside the conduit to equalize, thereby allowing the primary float to unseat and the valve to automatically re-open.

14 Claims, 8 Drawing Sheets

AUTOMATIC SEPARATOR VALVE

This application is a continuation-in-part of copending application Ser. No. 07/709,105, filed Jun. 3, 1991 now abandoned.

FIELD OF INVENTION

The present invention relates to a means for the prevention of the accidental discharge of oils and other liquid contaminents into sewage systems, streams and other bodies of water, and, to the control of processes requiring regulation of the flow of liquids with differing specific gravities. In particular, the present invention relates to direct-acting, outlet-closing, specific-gravity sensitive, float controlled separator valves which are automatic cycling.

DISCUSSION OF PRIOR ART

Although the present invention has application in the prevention of discharges and accidental mixing of many liquids, for simplicity, its application in the prevention of oil discharges will be described.

As is generally known, most oils are immiscible with water and, due to the lower density of the former, tends to rise to the surface of the water.

It has long been the practice to install grease traps, or oil-water separators, in waste water lines which may be contaminated with oil.

In general these devices provide a containment in which the oil and water mixtures are permitted a period of quiescence during which the lighter density oil rises to the surface of the water where it is contained by baffles or walls. The heavier density water is drained from the lower portion of the containment.

When the grease trap becomes full with oil it must be pumped out or the oil removed by some other means. If the oil is not removed, or, if due to an accident, the containment is flooded with oil, then the oil will start flowing out through the water drain.

To reduce the probability of water pollution due to oil spills and discharges of oil in industrial waste water effluents, grease traps, oil-water separators, dikes, holding ponds and other containment devices are installed in great numbers, frequently at the direction of government agencies concerned with environmental protection. In all of these containments it is necessary to provide for drainage of rain or other waste water. It the containment becomes filled with oil while the water drain valve is open then the oil will be discharged, causing pollution.

Prior devices are known which automatically close water drains in such containments to prevent the accidental discharge of oil or other liquid containments by utilizing the lower density of the oil to effect the sinking of a float which in turn seals off the water drain. U.S. Pat. No. 4,132,238 is an example of such a device.

Such prior devices typically rely on a specific gravity sensitive float to sink in the less dense liquid, (typically oil), and thereby close an outlet orifice.

A problem which is inherent in such prior devices is that whenever the float closes the outlet orifice, (whether due to sinking in a lower density liquid; or by accidental closing due to being drawn towards the outlet by the eductive pressure of the discharging effluent; or due to the seating of the float in the absence of any liquid in the device), the float cannot automatically be re-opened simply by the introduction (or re-introduction) of water into the device. Instead, such prior devices must be manually re-opened once closed.

This is due to the fact that the float sinks only when there is relatively low (and in some cases, no) hydrostatic pressure at the bottom of the float, and, therefore, relatively low (and in some cases, no) hydrostatic pressure inside of the outlet conduit at the seat of the float. When water is re-introduced into the device so as to completely immerse the float is inherently greater (and in most cases significantly greater) than the hydrostatic pressure inside of the outlet conduit and acting on the bottom of the float. Since the net buoyant force available to lift (i.e. unseat) the float is afforded by the relatively minimal difference in specific gravity of the oil and the water, it is virtually impossible for such a net buoyant force to overcome the seating force of the float and, thereby re-open prior direct-acting, large-orifice devices.

Prior needle valve devices are known wherein a direct-acting float can be re-floated to re-open a relatively small orifice. A problem of such prior devices is that flow through the needle valve's orifice is necessarily very slow and is not appropriate for use, for example, in the draining of bulk storage tanks. Another problem of devices whose primary discharge orifice is a needle valve orifice is that such devices are not adaptable for thick or debris-contaminated liquids (as such liquids tend to clog the small orifices).

In the case of oil having a specific gravity of, for example, 0.87, and a float having a specific gravity between that of the oil and that of water of, for example, 0.94, it can be shown that the maximum allowable head that can be added before which in a direct-acting float cannot be re-floated can be calculated by the equation:

$$Y = 0.06 \, LX,$$

where Y is the difference in total head pressure above the orifice (in inches of water) and the water head below the valve seat (in inches of water); and L is the vertical length of an elongated float; and X is the ratio of cross-sectional area of the float to the area of the orifice upon which the elongated float is seated.

By use of this (above) equation it can be demonstrated that for a practical size direct-acting valve whose length (L) is 12 inches, and whose ratio of float area to valve seat area (X) is no greater than 1.25/1, it would be impossible to re-float the float if the difference in elevations between the inlet and the outlet is more than more than 0.9 inches, (or, approximately 0.03 pounds per square inch of head). Similarly, it can be demonstrated that to re-float a direct-acting valve whose (gravity flow) inlet is 6 inches above its outlet (Y), and whose ratio of float area to valve area (X) is no greater than 1.25/1, the float would have to be at least 80 inches high. This analysis shows that for direct-acting floats of a practical size, the maximum allowable head against which such devices would be capable of automatically re-opening is very small, (in the 1-inch to 2-inch range). Thus, it will be appreciated by those skilled in the art that, for all purposes, a float in a common direct-acting 12-inch diameter valve therefore will not be re-floated due, for example, to storm water entering a catch basin containing such a valve.

A device which automatically resets for continuous decantation of two immiscible liquids is described in my co-pending U.S. patent application Ser. No. 696,956). In the device described in the co-pending application, a series of three different floats in two separate chambers cooperate with each other to automatically discharge only the heavier liquid (i.e. water), to displace the lighter liquid (i.e. oil) back to its source, to automatically close whenever oil is present, and to automatically reopen whenever sufficient quantities of water are reintroduced to the device. A problem of the device described in the co-pending application is that it requires two separate chambers and three different floats.

OBJECTS

Accordingly, the primary object of the present invention is to provide a specific gravity sensitive valve whereby the denser of two liquids is permitted free gravity discharge therefrom and the lens dense of said two liquids is contained.

A further object of the invention is to provide a device of the character described wherein means are provided to permit said less dense liquid to be diverted to a secondary containment vessel.

A further object of the invention is to provide a device of the character described in which discharge of said denser liquid, once stopped, may automatically restart when sufficient quantity of said denser liquid is accumulated therein without allowing any of said less dense liquid to be discharge through a primary outlet.

It is a further object of the present invention to provide a device of the character described in which discharge of said denser liquid therefrom may be at a high rate and not restricted to flow through a needle valve or similar small orifice.

These and other objects and advantages of the present invention will become better understood to those skilled in the art by reference to the drawings and ensuing description thereof.

DRAWINGS

DESCRIPTION

Figure 1:
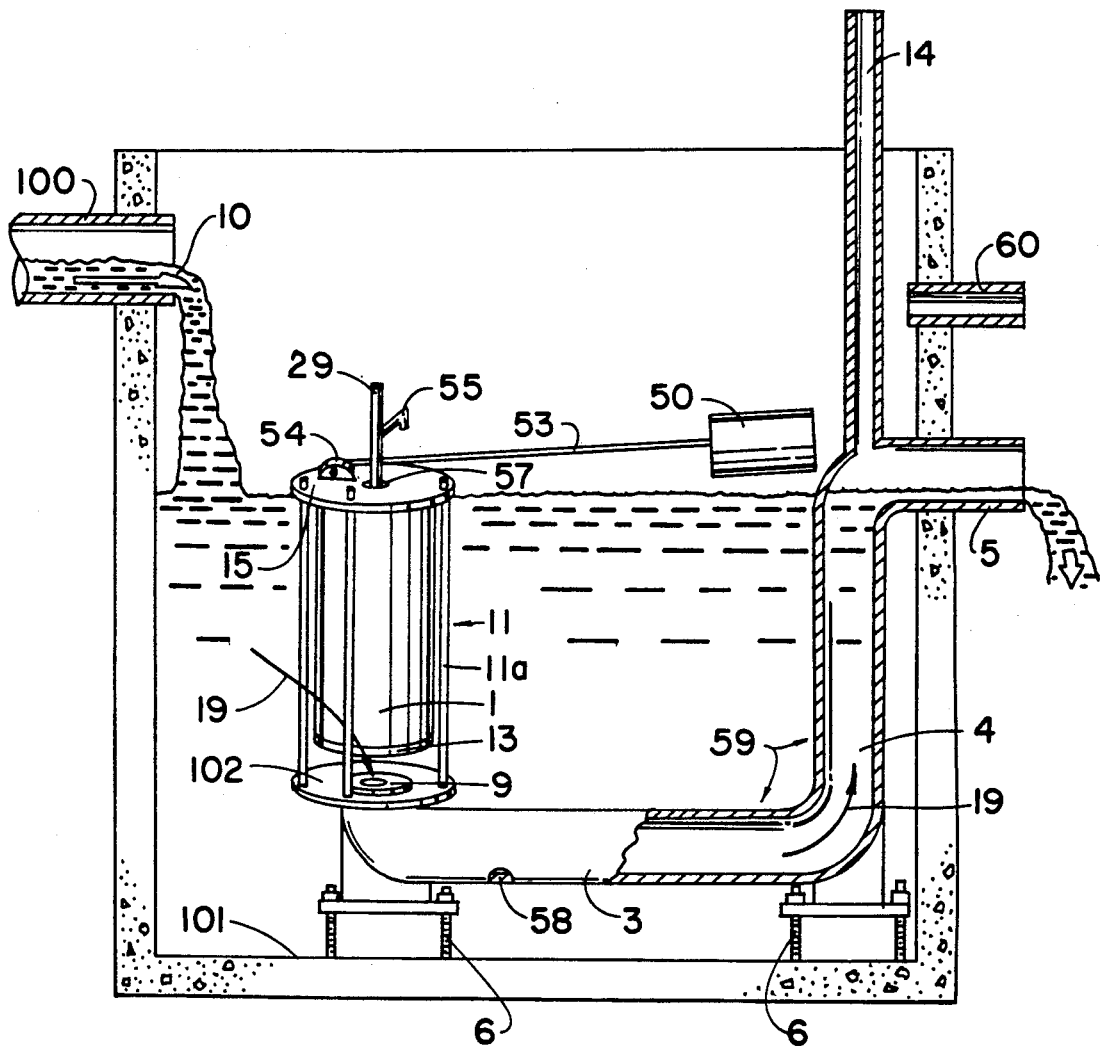
FIG. 1 is a side elevation in cross section of the present invention.

A preferred embodiment of this invention is illustrated in FIG. 1.

An outlet conduit, generally indicated as 59 in the drawings, comprising a horizontal conduit 3 and a riser 4, is connected to the discharge outlet pipe 5. Horizontal conduit 3 is fixed at a level position. Legs 6 may be provided to lift horizontal conduit 3 to a position above the floor 101 of containment 2 avoiding fouling by contact with settled grit and sludge.

Minimum liquid level in containment 2 is determined by the level of the discharge outlet pipe 5, which is at a level such that primary float 1 is buoyed high enough to allow free passage of water through primary orifice 9.

Waste water 10 enters containment 2 through inlet 100 from an external source (not shown). Sand, sludge and other components heavier than water, settle to the floor 101 of containment 2. Oil, being lighter than water, rises to the top and is prevented from passing through primary orifice 9.

Oil-free water flows through, around and beneath primary float 1, through primary orifice 9, conduit 3, up riser 4, and is discharged through the horizontal outlet pipe 5, as indicated by arrows 19.

Primary float 1, comprised of a watertight elongated body, having a specific gravity of less than 1.00, and greater than the specific gravity of the oil or other lighter than water fluid, is contained in housing 11, which in the preferred embodiment of the invention comprises four or more vertical rods 11a attached to a top plate 15 and a bottom plate 102.

One end of a link arm 53 is attached to the housing top plate 15 by a hinge connection 54 such that the link arm may freely pivot upwardly and downwardly. A secondary float 50, having a specific gravity greater than that of oil and less than that of water, is attached to the opposite end of link arm 53. A substantially horizontal lift arm 55 is attached to a vertical centering rod 29 which extends from the top of float 1 and upwards through a hole 57 in the housing top plate 15. The lift arm 55 is positioned far enough above the top of the primary float 1 that the primary float 1 can sit on the top of the primary orifice 9 when the secondary float 50 is in its lowest position. Link arm 53 is located underneath lift arm 55 such that when link arm 53 is pivoted upwardly it may lift arm 55, which simultaneously lifts primary float 1. In the preferred embodiment of the invention the distance between the hinge connection 54 and the lift arm 55, as measured along link arm 53, is significantly shorter than the distance from the lift arm 55 to the centroid of the secondary float 50, such that a high mechanical advantage is realized at the primary float 1 by an upward force on the secondary float 50.

In the preferred embodiment of the invention an oil/waste outlet 60 leads from the inside to the outside of the containment 2. In the preferred embodiment of the invention the flow of fluids into and out of the containment 2 is accomplished by gravity flow of the respective fluids. The water discharge outlet 5 is at an elevation below that of the waste water inlet 100. The water discharge outlet 5 is at an elevation above that of orifice 9 and is sufficiently high such that when the level of water inside of the containment 2 is as high as the elevation of the water discharge outlet the primary float 1 may float. The oil/waste outlet 60 is preferably at an elevation above the water discharge outlet 5, and below the elevation of waste water inlet 100.

OPERATION

Referring to FIG. 1

When housing 11 contains water only, primary float 1 floats in the water so that valve disc 13 is clear of orifice 9, permitting water to flow through orifice 9, conduit 3, up riser 4, discharging through outlet pipe 5. As is common practice with waste water drains, outlet pipe 5 may be vented, (pipe 14), to prevent siphoning. Vertical movement of primary float 1 is limited by top plate 15. As water continues to enter the containment 2 through waste water inlet 100, the water continues to be discharged through the water discharge outlet 5.

When oil is contained in the waste water 10, oil entering the containment 2 will rise to the surface while the water, being more dense than oil, continues to flow through housing 11, passes through open primary orifice 9, and is discharged through the water discharge outlet 5, as indicated by arrows 19.

Figure 2:
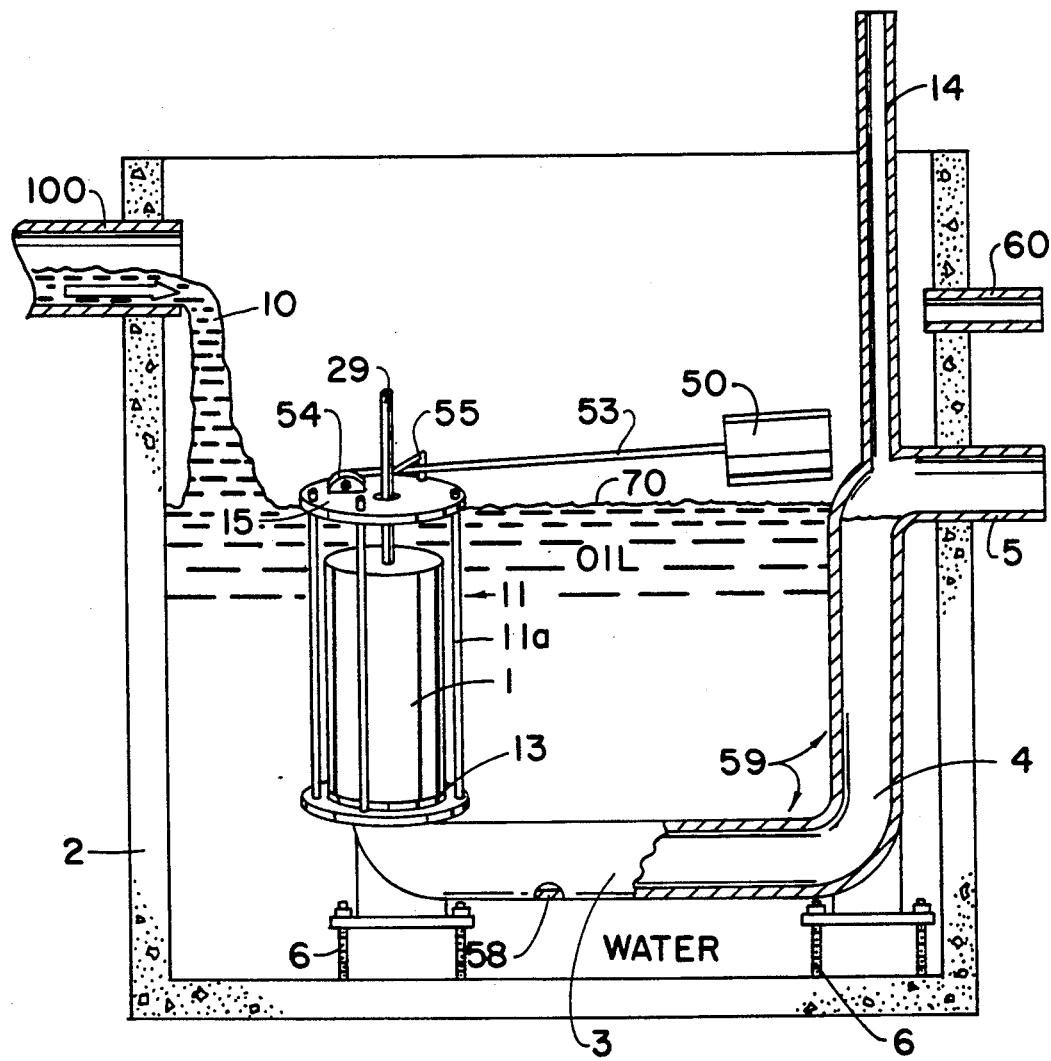
FIGS. 2-5 are cross sectional views of the present invention showing successive stages of operation.

Referring to FIG. 2

As the amount of accumulated oil at the surface 70 within containment 2 increases, the depth of the oil-water interface is lowered. Oil entering housing 11 lowers the specific gravity of the fluid therein, causing primary float 1 to lose buoyancy, and, subsequently, to sink.

Primary float 1 is restricted in its lateral movements by housing 11 which maintains primary float 1 in a position directly above primary orifice 9. When the specific gravity of the fluid within housing 11 is less than the specific gravity of primary float 1, primary float 1 will sink and come to rest upon orifice 9 as shown in FIG. 2, causing discharge from the containment 2 to cease.

If waste water 10 continues to enter the containment 2, the liquid inside of the containment will accumulate above the depth necessary to sink float 1, and pressure on the valve disk 13 will increase proportional to the depth of the liquid 70 in the containment 2, producing a more secure seal. This buildup of pressure will increase until the level of the liquid 70 reaches the elevation of the oil/waste outlet 60.

Figure 3:
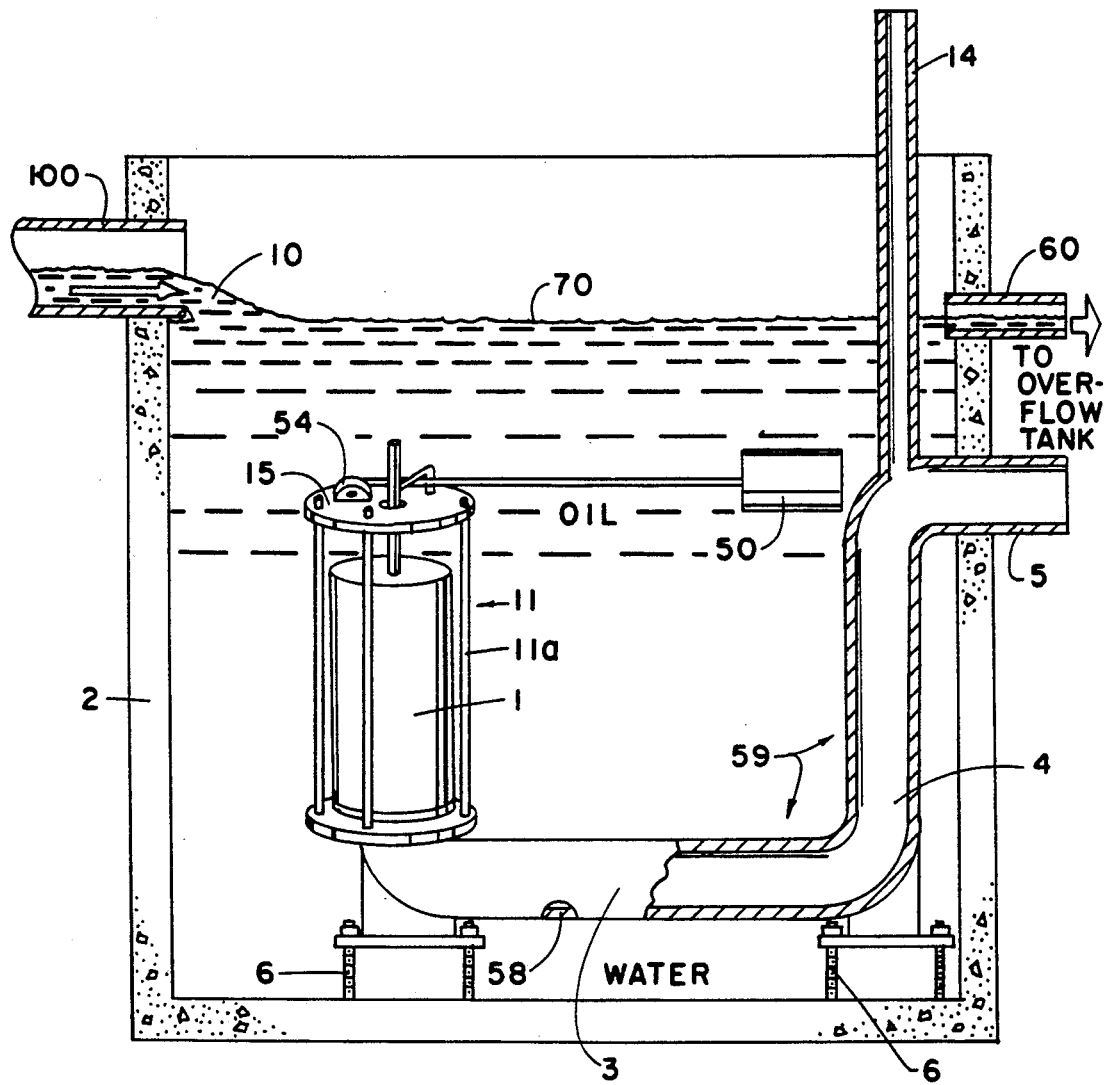

Referring to FIG. 3

If waste water 10 continues to enter the containment 100 after the discharge has been stopped (i.e. after the primary float 1 has sunken), the level of the liquid inside of the containment will continue to rise.

Because oil is less dense than water, the oil in the waste water inside of the containment 2 will tend to accumulate near the top of the liquid 70. Secondary float 50, being of specific gravity less than that of water but greater than that of oil, will sink in the oil which has accumulated at the top of the liquid in the containment 2.

As waste water 10 continues to enter the containment 2, the level of the liquid 70 in the containment 2 rises until it reaches the elevation of the oil/waste outlet 60, whereupon the upper layer 70 of liquid in the containment overflows through the oil/waste outlet 60 and is subsequently directed to an overflow tank (not shown).

If oil alone continues to enter the containment 2 via the waste water inlet 100, the elevation of oil/water interface of the liquid in the containment 2 will remain substantially constant, and the oil will continue to be discharged through the oil/waste outlet.

In the preferred embodiment of the invention, the secondary float 50 is nominally positioned at an elevation beneath that of the oil/waste outlet and above that of the center of the primary float. However, the primary float 1 and the secondary float 50 can be located at the same elevation.

Figure 4:
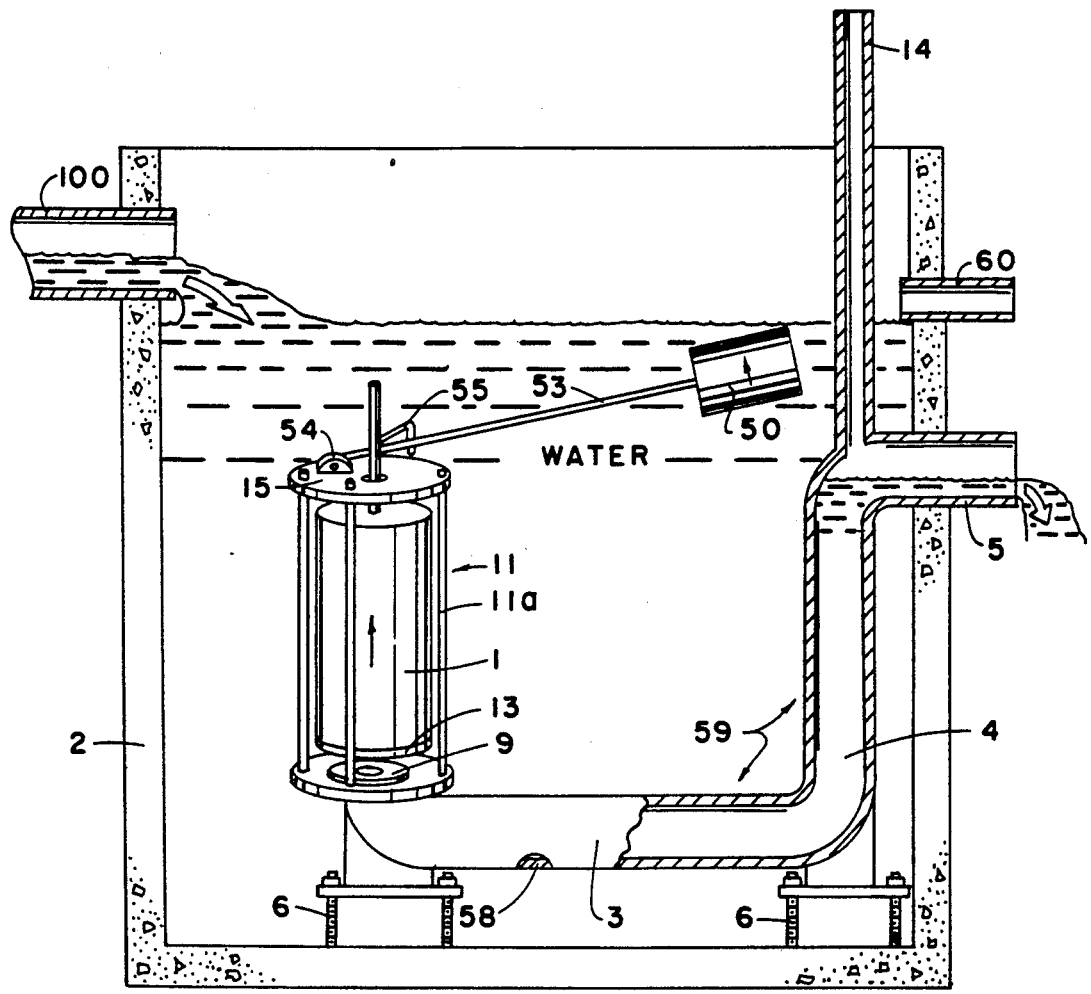

Referring to FIG. 4

If additional water begins to enter the containment 2 when both the primary float 1 and the secondary float 50 are initially sunken, the elevation of the oil water interface of the liquid in the containment 2 will rise (as the oil at the top of the liquid 70 in the containment 2 is discharged through the oil/waste outlet 60).

It will be appreciated by those skilled in the art that even when the elevation of the oil/water interface has risen high enough to completely immerse the primary float 1 in water, the primary float 1 will have insufficient buoyancy to unseat valve disc 13 from primary orifice 9 and float itself free, unless the pressure head between the inlet 100 and the discharge outlet 5 is less than the difference between the specific gravities of water and the primary float, times the length of the primary float, times the ratio of the diameter of primary float to the diameter of the primary orifice. As previously discussed above, for primary floats of practical diameters and lengths, and for large diameter orifices, direct-acting primary floats can only re-float themselves against negligible pressure heads.

In the preferred embodiment of the invention, a secondary float 50 having a specific gravity less than that of water (1.00) and greater than that of oil, is pivotally connected via link arm 53 to a hinge connection 54 on housing to plate 15. When the liquid surrounding the secondary float 50 has a specific gravity greater than that of the secondary float, the secondary float will tend to float in the liquid. The link arm 53 exerts an upward force on the underside of lift arm 55 equal to the buoyant force of secondary float 50 times the mechanical advantage afforded by the relatively longer distance between the secondary float 50 and the lift arm 55 than between the hinge connection 54 and the lift arm 55.

It has been determined that the net upward force "F" which must be applied by the link arm 53 to the underside of the lift arm in order to unseat the primary float must be at least:

$$F = (L)(A1)(SG-1) + (A2)(H1-H2),$$

where F is the minimum supplemental upward force which must be applied to the primary float 1; L is the length of the primary float 1; A1 is the cross-sectional area of the primary float; A2 is the area of the primary orifice; SG is the specific gravity of the primary float 1; and H1-H2 is the difference between the liquid heads above and below the seated valve disc 13.

Furthermore, it can be demonstrated that the lifting force of the secondary float 50 needs to be at least F/MA, where F is the minimum supplemental upward force (described above) which must be applied to the primary float 1; and MA is the mechanical advantage provided to the lift arm 55 by the link arm 53 mechanism.

In the preferred embodiment of the invention both the primary float 1 and the secondary float 50 have a specific gravity of 0.94; the mechanical advantage of the link arm 53 is 15:1; the primary float is approximately 8 inches long and has a cross-sectional area of 35 square inches; the secondary float has a volume of approximately 350 cubic inches; and the primary orifice has an area of approximately 28 square inches. The device so constructed develops a lifting force in water of approximately 0.77 pounds at the secondary float 50, (or approximately 11.5 pounds at the lift arm 55), and the primary float 1 can, therefore, automatically be lifted (i.e. become unseated) against inlet-to-outlet heads of up to 12 inches.

Once the primary float 1 has been unseated, as described above, the primary float 1 has sufficient buoyancy in water to remain floating; and water near the bottom of the containment 2 again begins to discharge through the primary orifice 9, the horizontal conduit 3, the riser 4, and the water discharge outlet 5.

In the preferred embodiment of the invention, link arm 53 is loosely positioned beneath lift arm 55 so that after the lift arm 53 has lifted the primary float sufficiently to break the seal between the valve disc 13 and the orifice 9, the primary float 1 may continue floating upwardly unrestricted by the movement of the lift arm 53. Also, in the preferred embodiment of the invention, the link arm 53 is designed to raise the lift arm 55 approximately ½ inch, which corresponds to a vertical movement of the secondary float 50 of approximately 7.5 inches when the mechanical advantage of the link arm 53 mechanism is 15:1.

Figure 5:
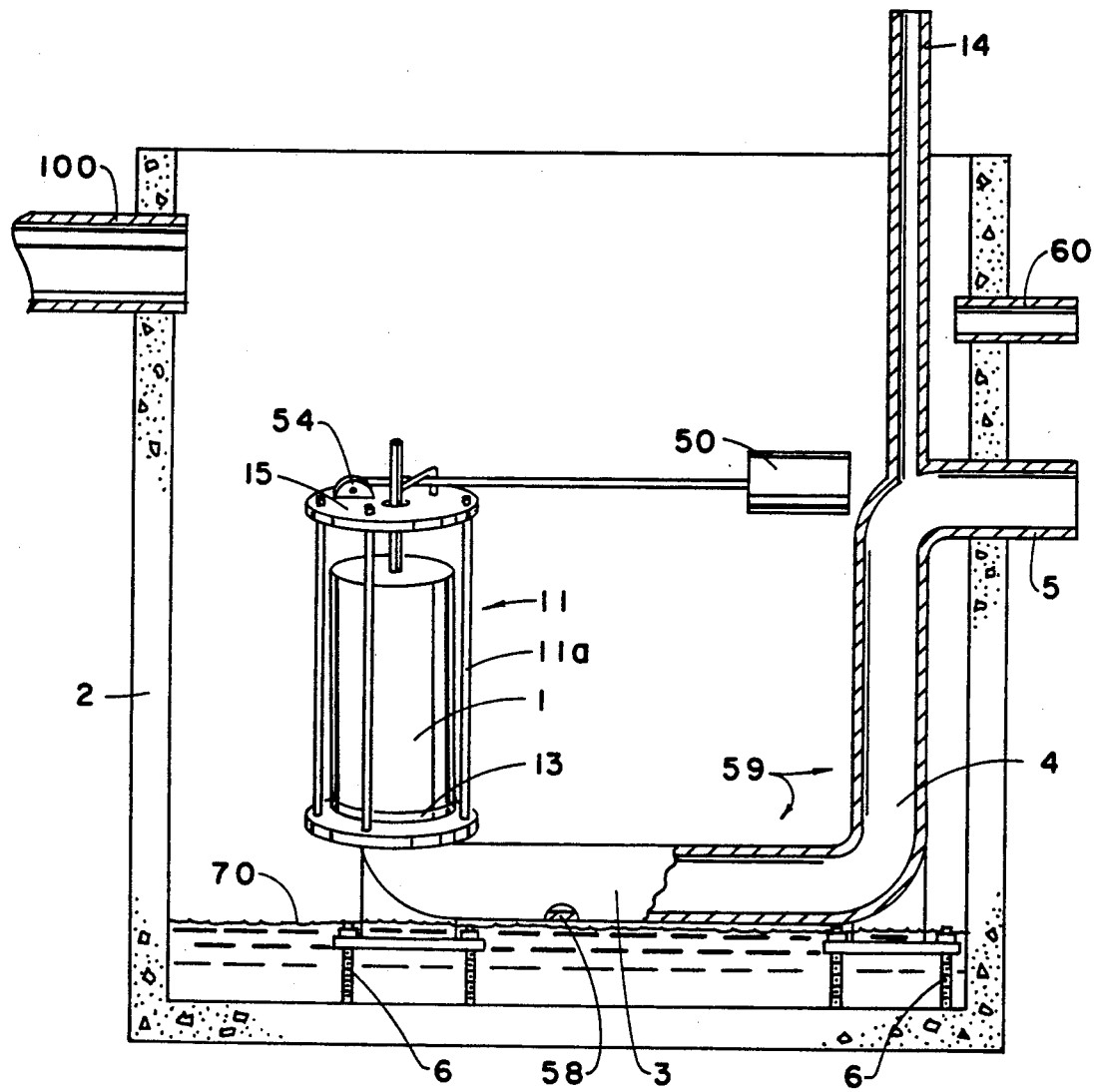

Referring to FIG. 5

In instances where waste water is no longer being introduced into the containment 2, and there is insufficient liquid to float the primary float 1 free of the primary orifice 9, the primary float and valve disc 13 rest on top of the primary orifice 9. This condition may typically occur when, for example, the device is newly installed and there is little or no water in the containment 2, or when no waste water has been introduced into the containment 2 for long periods of time and the liquid inside of the containment evaporates.

When the containment is filled (or refilled) with water after being emptied, the primary float will not be able to unseat itself without the help of the secondary float for the reasons discussed above. Due to the lack of any liquid inside of the riser conduit 4, and the corresponding lack of hydraulic pressure exerted against the underside of the primary float by liquid inside of the outlet conduit 59, the seating pressure at the valve disc 13 may be fairly high. In order to minimize the net seating pressure of the valve disc 13 against the primary orifice 9, it may be desirable to provide a small bleed hole 58 in the outlet conduit 59 through which liquid inside of the containment 2 may slowly pass into the outlet conduit, so as to raise the head pressure inside of the outlet conduit 59 closer to that of the head pressure outside of the outlet conduit 59. When a bleed hole 58 is used, it is preferable that the diameter of the bleed hole 58 is considerably small than (i.e. on the order of 1/10th) the diameter of the primary orifice 9, so that in the event of an accident, the rate at which waste water discharges through the bleed hold 58 will be minimal. It will be appreciated by those skilled in the art that the present invention will function as previously described with and without the bleed hole 58. It will also be appreciated by those skilled in the art that by using a bleed hole 58, the highest head which can be effected inside of the outlet conduit while the primary float 1 is seated, is equivalent to the height of the water discharge outlet 5, which necessarily cannot be higher than the elevation of the waste water inlet 100. Therefore, even using a bleed hole in the outlet conduit 59, the supplemental lifting force F described above, wherein $$F=(L)(A1)(SG-1)+(A2)(H1-H2),$$

must be provided to the primary float 1 in order to unseat it. As previously mentioned, H1-H2 is the difference between the liquid heads above and below the seated valve disc 13. When a bleed hole 58 is used, or when the outlet conduit 59 is already full of liquid, H1 is the height of the liquid inside of the containment 2, and H2 is the height of the liquid inside of the riser 4, which in no case can be higher than the water discharge outlet 5.

Figure 6:
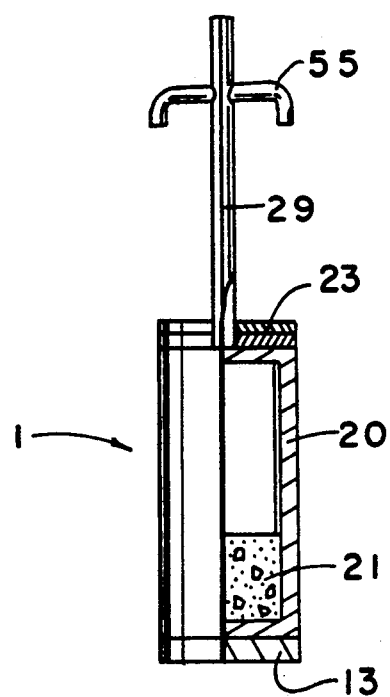
FIG. 6 is a front view in partial cross section showing the construction of the primary float.

A more complete description of the component parts of the separator valve follows. FIG. 6 illustrates the construction of float 1, which is comprised of a watertight hollow body 20, ballast 21, rod 29, and valve disc 13.

Body 20 is elongated vertically. Ballast 21 is of high density material such as cement and is placed in the lower portion of the body 20 causing the center of gravity of float 1 to be near its lower end, such that float 1 is vertically stable when supported by buoyant forces.

Sufficient ballast 21 is used to make the specific gravity of float 1 less than 1.00 but more than the specific gravity of the oil. It has been found practical to ballast the float to a specific gravity of 0.94 to 0.95 if the device is to used with petroleum based oils. However, the amount of ballast may be varied to obtain a float with a higher or lower specific gravity, depending on the character of the liquid and the sensitivity required.

The total buoyant forces acting directly on float 1 is resultant of the buoyancy contributed by the water and by the layer of oil acting on float 1. Since the oil has a specific gravity less than water, the thicker the oil layer the less the buoyant force. When the combined buoyant force of the water and the oil is less than the weight of float 1, it will sink, closing the orifice 9.

Rod 29 is attached to float 1 and extends up through opening 57 in cover 15. Rod 29 is used to provide visual indication of the vertical position of float 1. Rod 19 may also be used to actuate a switch or other device to signal the vertical position of float 1.

Figure 7:
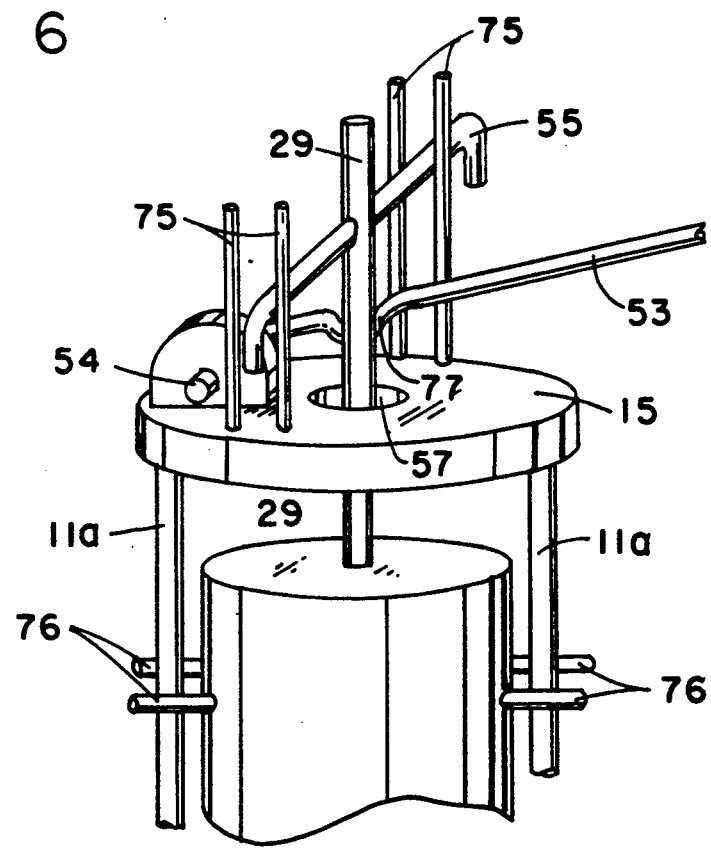
FIG. 7 is a perspective view showing the construction of the top of the housing of the primary float.

Float 1 is loosely constrained over the orifice 9 by rods 11a of housing 11. Since float 1 floats in the vertical position, it is only necessary for housing rods 11a to constrain the float against horizontal movement, such that the valve disc 22 will completely cover orifice 9 when float 1 sinks. In this manner, close clearance which could cause sticking of the float are avoided. Float 1 may be prevented from rotating about its axis by providing horizontal retention guides 76 or vertical retention guides 75, which cooperate with housing rods 11a or the lift arm 55, respectively, as shown in FIG. 7.

Valve disc 13, on the lower end of float 1, is in a plane perpendicular to the vertical axis of the float and is so constructed so as to form a watertight seal when float 1 sinks and valve disc 13 covers orifice 9. The valve disc may be made of soft, pliable, closed cell gasket material or of other materials and configurations as is common practice in the manufacture of valves.

An offset 77 is preferably provided in the ink arm 53 in the vicinity of the lift arm 55 so that when the link arm 53 pivots upwardly the lift arm 55 does not slide down the link arm 53 towards the hinge connection.

Figure 8:
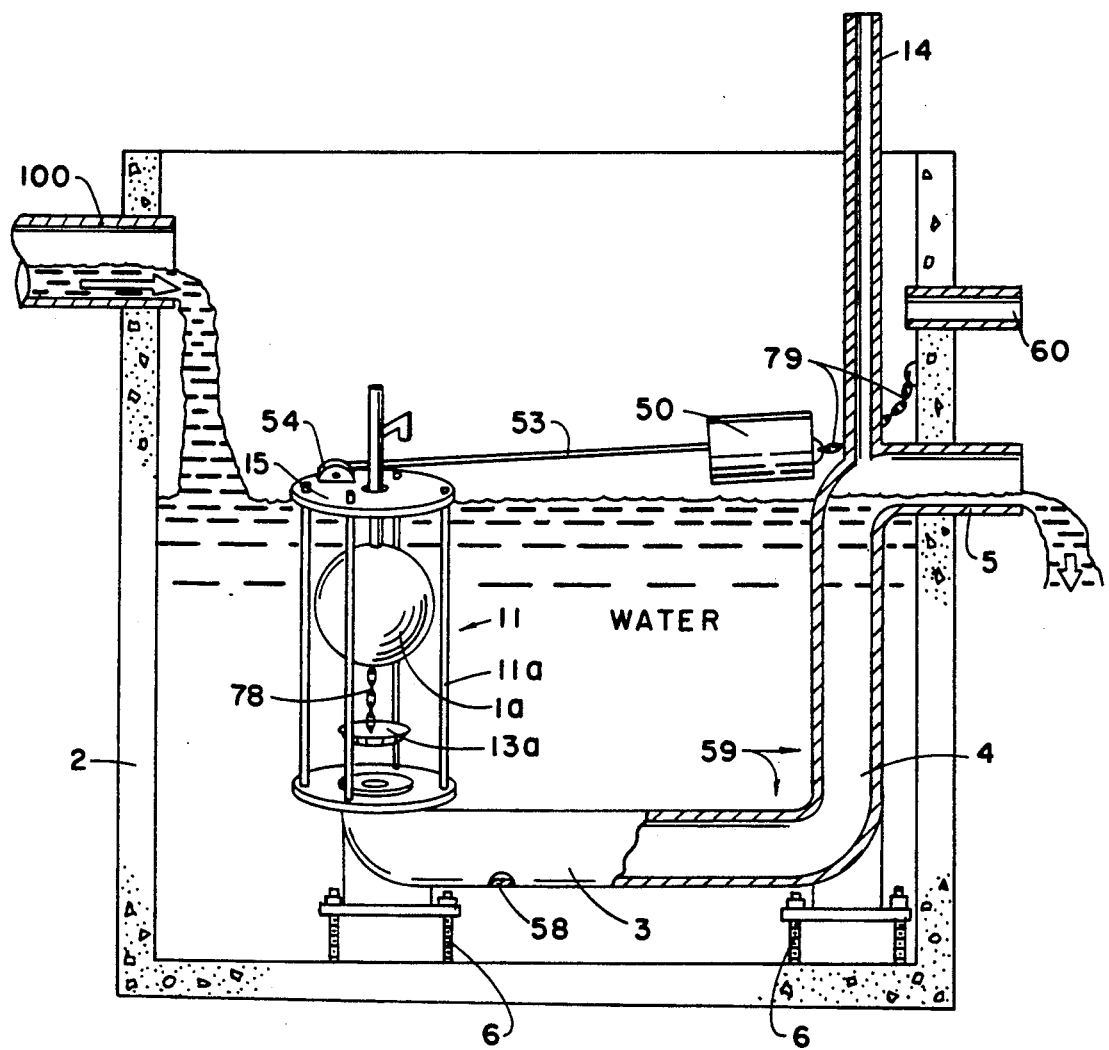
FIG. 8 is a side elevation in cross-section showing a modification of the present invention; and, FIG. 9 is a side elevation in cross-section showing a modification of the present invention.

In the preferred embodiment of the invention, the primary float 1 comprises an elongated body 20. This construction is considered preferable because it minimizes the requirements for close tolerances in the construction of the device, and allows for floating/sinking of the primary float 1 while the oil/water interface of the liquid in the containment 2 is a considerable (i.e. safe) distance from the primary orifice. A modification of the present invention is shown in FIG. 8 in which a spherical (i.e. non-elongated) primary float 1a is attached via disc link 78 to a detached valve disc 13a. This modification of the invention allows for the use of non-elongated primary float 1a which will still sink (and thereby cause the seating of the valve disc 13a) while the oil/water interface is considerable (i.e. safe) elevation above the primary orifice.

Figure 9:
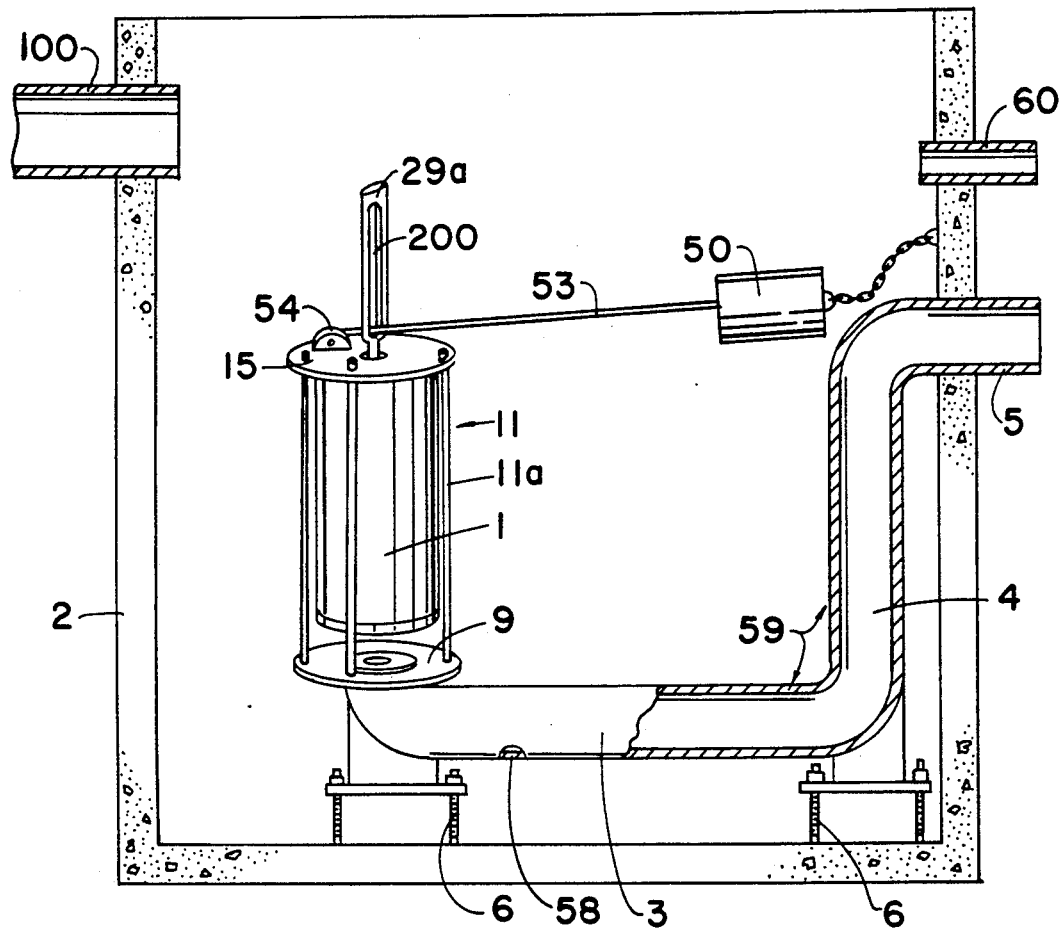

An important modification of the present invention is illustrated in FIG. 9. In this modification of the invention, a slotted centering rod 29a extends from the top of the primary float 1. The link arm 53, which is connected to the secondary float 50, passes through the slot 200 in the centering rod 29a. The slot 200 extends longitudinally along the centering rod 29a such that the top of the slot 200 allows the primary float 1 to seat upon the orifice 9 when the primary float 1 is at the lowermost extent of its travel; and such that the bottom of the slot 200 does not inhibit the primary float 1 from travelling to the upwardmost extent of its travel. It will be appreciated by those skilled in the art that this modification of the present invention simplifies the manufacture and assembly of the device of eliminating the additional lift arm 55 components (used in the preferred embodiment of the invention, as shown in FIGS. 1-5), and, because the slot 200 acts as a rotational guide for the primary float 1, by eliminating the need for additional float guides (such as components 75 and 76 as shown in FIG. 7). In addition, this modification of the present invention simplifies the operation of the device, and thereby increases its reliability, by eliminating the need for the lift arm's being lined up properly with the link arm 53 (as discussed above in reference to the preferred embodiment of the invention), and by eliminating any friction which may have otherwise resulted from the use of float guides (such as components 75 and 76, as shown in FIG. 7 of the preferred embodiment).

While the above description contains specificities, these should not be construed as limitations on the scope of the invention, but rather as an exemplification of the preferred embodiment and one modification thereof. Many variations are possible, for example:

The secondary float 50 may be either directly attached to the link arm 53 as described, or may simply be in communication with the primary float via a combination of mechanism whereby a mechanical advantage is developed from the lifting force of the secondary float to the primary float;

Although the lifting force of the secondary float 50 is applied to the primary float 1 by way of the link arm 53 acting against a lift arm 55 indirectly attached to the top of the primary float (i.e. to the rod 29 extending therefrom), the lifting force of the secondary float 50 can alternatively be applied to the lower side of the primary float;

Housing 11 can be a perforated pipe or other structure inside of which the primary float 1 is disposed;

Lift arm 55 can be configured of many different shapes and designs, (and particularly double arms which together within the pivot connection 54 effects a clevis joint), so long as a member 53 in communication with the secondary float 50 can apply an upward force to it when the secondary float is lifted;

The secondary float 50 may be enclosed inside of a perforated housing in order to minimize the opportunity for debris inside the containment 2 to accidently impede its movement;

The device may be adapted for use with liquids other than oil and water, so long as the primary and secondary floats each have densities lighter than that of the heavier liquid, and heavier than that of the lighter liquid;

The containment 2 may either be a closed or open vessel, and when the containment 2 is a closed vessel the pressures inside of the vessel may be greater than those derived from gravity flow;

A chain 7 or other movement limiting device may be provided in communication with the secondary float 50 (as shown in FIG. 8), to restrict the vertical movement of the secondary float 50 and to relieve stress in the link arm 53;

The containment 2 may be provided without oil/waste outlet 60, in which construction of the invention only water is gravity discharged from the containment 2, while oil/waste may be pumped out of the containment 2 by the use of auxiliary pumping equipment; and, In place of a valve disc 13, the underside of float may be compatably formed such that when the primary float 1 rests on top of the orifice 9 the bottom of the float 1 adequately closes the orifice;

Accordingly, the scope of the invention should be determined not by the embodiment illustrated, but by the appended claims and their legal equivalents.

I claim:

1. A flow control device adapted to separate a mixture of two liquids of different densities, and for controlling the discharge therefrom of said two liquids, comprising:

a vessel;

inlet means through which said fluid mixture enters said vessel;

a conduit operationally disposed within said vessel provided with an upwardly opening orifice adapted to be closed by valve means;

said conduit further being in fluid communication with a first discharge outlet;

an operationally vertically movable first float positioned within said vessel;

orifice closing means situated beneath the lowermost extremity of said first float adapted to close said upwardly opening orifice when said float is at the lowermost extremity of the range of vertical movement thereof to prevent the flow of fluid into said conduit and said first discharge outlet;

means, in communication with said first float, for limiting the range of horizontal movement of said first float;

said conduit intermediately being substantially at an elevation higher than said upwardly opening orifice;

an operationally vertically movable second float positioned within said vessel; and means in communication with said first float and said second float by which an upward force applied to said second float effects an upward force upon said first float, wherein said upward force on said first float is greater than said upward force on said second float.

2. A flow control device adapted to separate a mixture of two liquids of different densities, and for controlling the discharge therefrom of said two liquids, comprising:

a vessel;

inlet means through which said fluid mixture enters said vessel;

a conduit operationally positioned substantially adjacent the lowermost extremity of said vessel provided with an upwardly opening orifice adapted to be closed by valve means;

said conduit further being in fluid communication with a first discharge outlet;

a housing member having a lower extremity interconnected with said conduit and surrounding said upwardly opening orifice, an opening in said housing to permit the flow of fluid thereinto from exteriorly thereof;

said conduit intermediately being substantially at the level of the upper extremity of an upper portion of the height of said housing and said vessel inlet being at least as elevated as said containment water discharge outlet; and an operationally vertically movable first float positioned within said housing;

orifice closing means situated beneath the lowermost extremity of said first float adapted to close said upwardly opening orifice when said float is at the lowermost extremity of the range of vertical movement thereof to prevent the flow of fluid into said conduit and said first discharge outlet;

an operationally vertically movable second float positioned within said vessel; and, means in communication with said first float and said second float by which an upward force applied to said second float effects an upward force upon said first float, wherein said upward force on said first float is greater than said upward force on said second float.

3. The device according to claim 2 wherein:
the specific gravity of said first float is less than the specific gravity of the first of said two liquids but greater than the specific gravity of the second of said two liquids.

4. The device according to claim 3 wherein:
the specific gravity of said second float s less than the specific gravity of the first of said two liquids but greater than the specific gravity of the second of said two liquids.

5. The device according to claim 4 wherein:
said first float is loosely constrained against horizontal movement within said housing, and wherein the buoyancy of said first float decreases proportionately at the length thereof immersed in said second liquid.

6. The device according to claim 5 further comprising:
a rod attached to said first float and extending upwardly therefrom.

7. The device according to claim 6 wherein said means in communication with said first float and said second float by which an upward force applied to said second float effects a corresponding upward force upon said first float comprises:
a lever arm member,
one end of said lever arm member being pivotally connected to an extension of said housing member by which means said lever arm member may freely rotate upwardly and downwardly;
a second end of said lever arm member being in communication with said second float; and
a float lifting member if fixed relationship to said first float;
wherein an intermediate length of said lever arm member is beneath said float lifting member,
whereby said lever arm may lift said lifting member and said first float, and may open said orifice closing means, when said second end of said lever arm member is raised.

8. The device according to claim 7 wherein said float lifting member is attached to said rod attached to said first float.

9. The device according to claim 8 further comprising:
a second discharge outlet, said second discharge outlet being at a higher elevation than the highest elevation of said conduit.

10. The device according to claim 9 wherein said lever arm member has a mechanical advantage of at least ten to one.

11. The device according to claim 10 wherein:
the ratio of the horizontal cross sectional areas of said first float and said orifice is no greater than two to one.

12. The device according to claim 11 wherein:
the elevation of said inlet means is at least six inches above the maximum elevation of said conduit.

13. The device according to claim 12 further comprising: an opening in the wall of said conduit, said opening being of smaller area than the area of said orifice.

14. A flow control device adapted to separate a mixture of two liquids of different densities, and for controlling the discharge therefrom of said two liquids, comprising:
a vessel;
inlet means through which said fluid mixture enters said vessel;
a conduit operationally positioned substantially adjacent the lowermost extremity of said vessel provided with an upwardly opening orifice adapted to be closed by valve means;
said conduit further being in fluid communication with a first discharge outlet;
a housing member being disposed above said upwardly opening orifice and having a lower extremity interconnected with said conduit;
said conduit intermediately being substantially at the level of the upper extremity of an upper portion of the height of said housing and said vessel inlet being at least as elevated as
said containment water discharge outlet; and
an operationally vertically movable first float positioned within said housing;
orifice closing means beneath the lowermost extremity of said first float adapted to close said upwardly opening orifice when said float is at the lowermost extremity of the range of vertical movement thereof to prevent the flow of fluid into said conduit and said first discharge outlet;
an operationally vertically movable second float positioned within said vessel; and,
means in communication with said first float and said second float by which an upward force applied to said second float effects an upward force upon said first float, wherein said upward force on said first float is greater than said upward force on said second float;
wherein the specific gravity of said first float is less than the specific gravity of the first of said two liquids but greater than the specific gravity of the second of said two liquids; and wherein the specific gravity of said second float is less than the specific gravity of the first of said two liquids but greater than the specific gravity of the second of said two liquids;
and wherein the difference between the elevation of said inlet means and the maximum elevation of said conduit is greater than the difference between the specific gravity of said first float and the specific gravity of said second float, times the ratio of the horizontal cross sectional areas of said first float and said orifice, times the height of said first float.

* * * * *